Nov. 5, 1968     R. M. SMITH     3,409,227
SPRINKLER

Filed Feb. 21, 1966     2 Sheets-Sheet 1

INVENTOR.
RICHARD M. SMITH

BY Kimmel, Crowell & Weaver
ATTORNEYS.

Nov. 5, 1968   R. M. SMITH   3,409,227
SPRINKLER
Filed Feb. 21, 1966   2 Sheets-Sheet 2

INVENTOR
RICHARD M. SMITH
BY Kimmel, Crowell & Weaver
ATTORNEYS.

United States Patent Office 3,409,227
Patented Nov. 5, 1968

3,409,227
SPRINKLER
Richard M. Smith, Rte. 1, Box 7, Scio, Oreg. 97374
Filed Feb. 21, 1966, Ser. No. 528,895
4 Claims. (Cl. 239—97)

ABSTRACT OF THE DISCLOSURE

Irrigation apparatus comprising an upright hollow conduit mounted for rotation about its longitudinal axis on support means, a plurality of water discharge arms connected on and in open communication with the upper end of the conduit, the mounting including means for connection to a source of water under pressure, valve means controlled by the rotation of the conduit for supplying the conduit with an additional volume of water at predetermined intervals of conduit rotation, and means for effecting rotation of the conduit and consequently of the water discharge arms.

---

This invention relates to a water sprinkler, and more particularly to a rotary type sprinkler that may be utilized in watering agricultural plants and which is so constructed and arranged as to water a square or rectangular area rather than a circular pattern.

As conducive to an undestanding of the instant invention, it should be understood that the ordinary water sprinkler used in either garden or agricultural pursuits is characterized by a vertical rotatable sprinkler head which distibutes water in a circular pattern with the sprinkler being the center of the pattern. A circular water distribution pattern has many disadvantages, the foremost being that most agricultural plots and lawns are configured as squares or rectangles with the result being that either the entire plot is not watered or a quantity of water is wasted by overshooting the desired area. In the watering of lawns, this has been overcome to a substantial extent by the utilization of wave-type sprinklers in which a row of sprinkler jets or nozzles are arranged along an arcuate, upwardly facing surface of a horizontal conduit which is caused to oscillate back and forth such that the water is discharged in the form of a flat fan which waves back and forth to create a rectangular water pattern.

This type of water sprinkler has not found acceptance in agricultural pursuits for many reasons, one being that the area to be covered is quite large, resulting in an unduly large sprinkler. Another reason that wave sprinklers have not been utilized in agricultural irrigation is that the plants being irrigated are often of considerable height necessitating the positioning of the sprinkler above the tops of the plants, which also results in an unduly large sprinkler. Accordingly, agricultural sprinklers remain in the old configuration in which a tall sprinkler head extends above the top of the plants and sprays in a circular area. Because of the large investment in irrigation water, when compared to the value of crops produced, it is apparent that a sizable profit margin may be created by providing an agricultural type sprinkler which distributes water in a square or rectangular pattern such that the entire plot will be watered and yet not waste water by overshooting the area to be irrigated.

It is accordingly a primary object of the instant invention to provide a rotary type water sprinkler which distributes water in a rectangular or square pattern in order to fit the water pattern to the area desired to be watered.

Another object of the instant invention is to provide a water sprinkler of the character described in which the rectangular or square water pattern is achieved by delivering additional amounts of water to the irrigated area at 90° intervals along the rotary path of the sprinkler head.

Still another object of the instant invention is to provide a rotary sprinkler which distributes water in a regular quadrilateral pattern in which the corners of the pattern may be varied slightly to accommodate wind drift and the like without necessitating the movement of the entire sprinkler body.

A further object of the instant invention is to provide a water sprinkler which distributes water in a regular quadrilateral pattern with the sprinkler being constructed with a minimum of time, effort and expense to achieve a relatively light weight, mobile and efficient unit.

Other objects and advantages of the instant invention reside in the combinations of elements, arrangements of parts, and features of construction and operation, all as will be more fully pointed out hereinafter and disclosed in the accompanying drawings wherein there is shown a preferred embodiment of this inventive concept.

Figure 1:
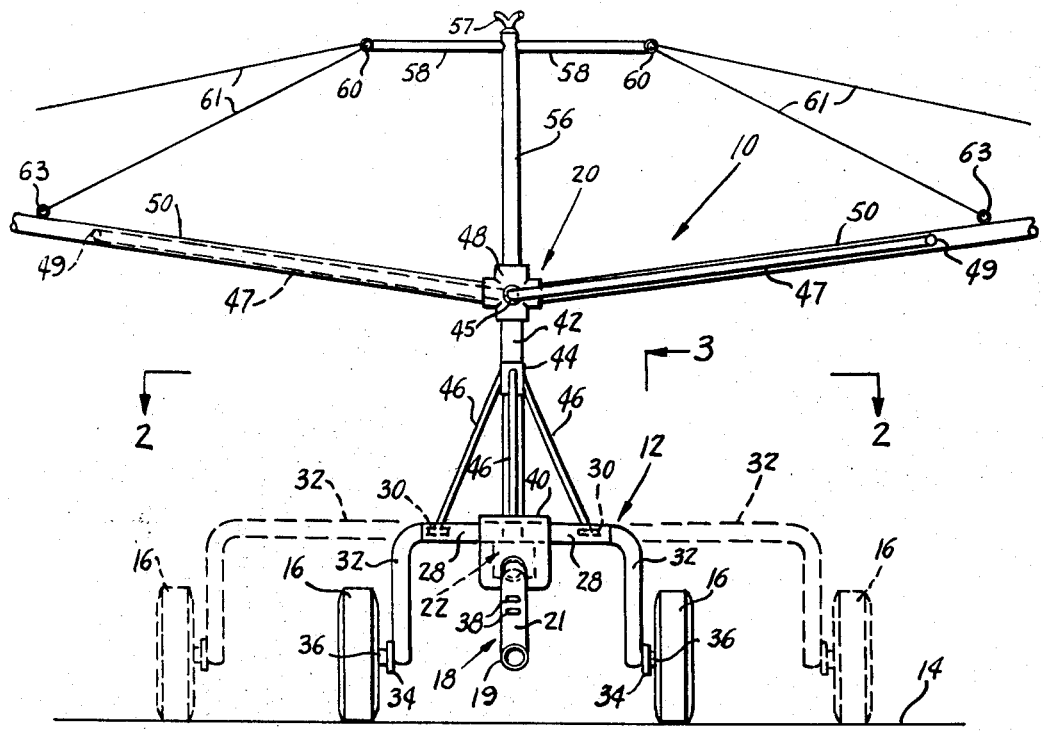
FIGURE 1 is a front elevational view of the water sprinkler of the instant invention illustrating in dashed lines the adjustability of the rollable supports in order to provide a more stable watering platform if circumstances permit.
Figure 2:
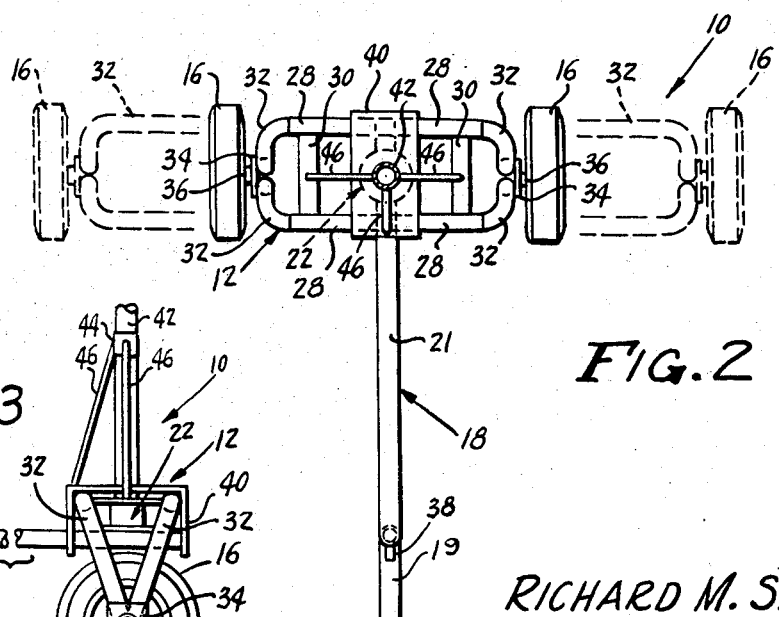
FIGURE 2 is a horizontal cross-sectional view of the water sprinkler of FIGURE 1 as may be seen from along line 2—2 thereof, as viewed in the direction of the arrows.
Figure 3:
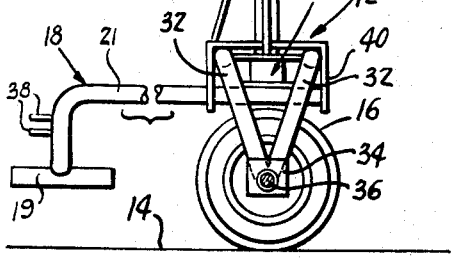
FIGURE 3 is a partial vertical cross-sectional view of the water sprinkler of FIGURES 1 and 2 taken substantially along line 3—3 of FIGURE 1 as viewed in the direction of the arrows.

Referring now to the drawings in detail, wherein like reference characters designate like elements throughout the several views thereof, and initially to FIGURES 1 to 3 inclusive, there is indicated generally at 10 the rotary water sprinkler of the instant invention having as its major components a frame shown generally at 12 movably mounted on an underlying surface 14 by a pair of wheels 16. A water supply pipe denominated generally at 18 delivers water under pressure from an irrigation pump or the like (not shown) to a sprinkler head shown generally at 20 through an intermediate water connection shown generally at 22. As will be more fully explained hereinafter, the passage of water through supply pipe 18 and sprinkler head 20 results in the rotation of sprinkler head 20 and the distribution of water onto ground surface 14 adjacent sprinkler 10.

As previously mentioned, the main purpose of water sprinkler 10 is to distribute water in a square or rectangular pattern about sprinkler 10 rather than in the ordinary circular pattern achieved by the conventional rotary sprinkler. This is achieved by the construction and arrangement of intermediate water connection 22 which periodically delivers an increased amount of water to sprinkler head 20 every 90° throughout its rotary movement. As will be more fully explained hereinafter, water connection 22, in effect, acts as a valve that is periodically opened a greater extent to increase the flow of water to sprinkler head 20. As may be seen in FIGURE 8, a constant volume delivery of water by a rotary water sprinkler creates a circular watered area 24. In accordance with the principles of the instant invention, a predetermined volume of water is delivered at 90° intervals throughout the rotation of sprinkler head 20 to water the corners of the regular quadrilateral water pattern 26.

Referring back to FIGURES 1 to 3 inclusive, frame 12 includes a horizontal base composed of a plurality of tubular sections 28 joined together by a pair of cross braces 30 with each of sections 28 receiving a complementary configured arm 32 which is bent downwardly and toward the transverse center line of frame 12 to form the V-shaped structure shown in FIGURE 3. As may be seen most clearly in FIGURE 3, a bracket 34 is affixed at the point on convergence through which a stub axle 36 is journaled providing for the rotation of wheels 16. As may be seen in FIGURES 1 and 2, arms 32 may be telescoped within sections 28 and within each other to provide a larger wheel base for sprinkler 10 if the terrain circumstances so permit. Any convenient means, such as a pin or the like, may be utilized to secure arms 32 in the expanded or retracted position.

As may be seen in FIGURE 3, water supply pipe 18 includes an inlet section 19, open at each end, with an L-shaped branch line 21 connecting the center thereof to water connection 22. The open ends of inlet 19 are formed to receive an irrigation pipe with a cap (not shown) being provided to close the unused end of inlet 19. The irrigation hose may therefore approach sprinkler 10 from either the forward or rearward end thereof. A pair of vertically spaced ears 38 are placed on the vertical section of L-shaped branch line 21 to provide a convenient means for attaching sprinkler 10 to a vehicle. An inverted U-shaped platform 40 secures water supply pipe 18 to frame 12 with fluid communication being provided between supply line 18, water connection 22 and a rotatable tubular conduit 42 of sprinkler head 20. A sleeve 44 and a plurality of diagonally depending braces 46 position tubular conduit 42 in an upright position while allowing for the rotation of conduit 42 within sleeve 44.

Sprinkler head 20 includes not only conduit 42, but also a 4-way connection 48 which acts to divert water passing through sprinkler 10 to a pair of sprinkler arms 50 which may be provided with any suitable type of spraying nozzle on the end thereof for distributing water on ground surface 14. As will be more fully pointed out hereinafter, a separate water delivery conduit 54, resides interiorly of tubular conduit 42 and provides water to an external fitting 45 extending through connection 48 with a plastic delivery tube 47 being fastened to the exterior of arm 50. Acting to rotate sprinkler arms 50 is a jet 49 affixed on the end of plastic delivery tube 47 acting to revolve arms 50 at a conventional rate, on the order of one revolution for every 2 to 5 minutes. Because of the substantially uniform rate of water delivery to jets 49, it will be seen that sprinkler arms 50 rotate at a substantially uniform rate. It will be readily apparent that the utilization of another means of rotating sprinkler head 20 will obviate the requirement for external fitting 45, delivery tube 47 and jet nozzle 49.

A standpipe 56 receives water through connection 48 and is provided with a plurality of small nozzles 57 for watering the area closely adjacent the sprinkler. An elongate bar 58 is secured, as by welding or the like to the upper end of standpipe 56 and carries a pair of eyes 60 on the outer ends thereof. A plurality of cables 61 interconnect eyes 60 and similar fastening means 63 on the sprinkler arms 50 for supporting a portion of the weight thereof.

As will be readily apparent, water passing through supply pipe 18 will flow into water connection 22 where a portion of it will be delivered to sprinkler arms 50 for watering at a distance from sprinkler 10 and to standpipe 56 and nozzles 57 for watering closely adjacent sprinkler 10. Water connection 20 will also divert an additional amount of water through water delivery conduit 54 to jet 49 to propel sprinkler arms 50 in their rotational path.

The first major component of water connection 22 is a housing 62 which is illustrated as having a cylindrical section 64, a lower frusto-conical section 66 having a reverted edge 68 at substantially the plane of the frustum thereof forming an inlet opening 70. A short hollow cylindrical connecting pipe 72 is in communication with branch line 21 and extends through opening 70 into housing 62 with a seal shown generally at 74 precluding fluid loss around the exterior of pipe 72.

Figure 5:
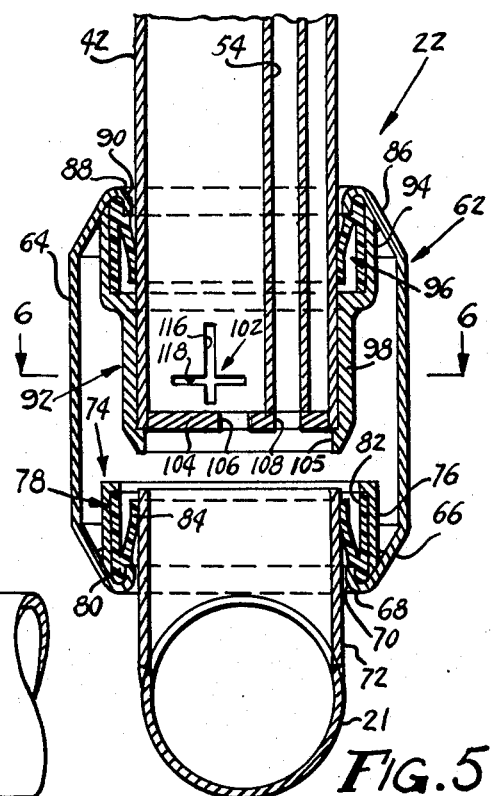
FIGURE 5 is a vertical cross-sectional view of the connection of FIGURE 4 taken substantially along line 5—5 thereof as viewed in the direction of the arrows.

Seal 74 includes a cylindrical wall 76 coaxial with opening 70 and pipe 72 and an annular gasket shown generally at 78 which is V-shaped in cross-section and made of rubber or the like as may be seen in FIGURE 5. The converging area 80 of gasket 78 is received between reverted edge 68 of frusto-conical section 66 and cylindrical wall 76 with a first leg 82 of gasket 78 being secured, in any conventional manner, to cylindrical wall 76. The other leg 84 of gasket 78 closely receives pipe 72.

Because of the upward facing of V-shaped gasket 78, it will be seen that the combined stretching of the aperture formed by inner leg 84 and pressure within housing 62 will result in an effective seal precluding the loss of water between reverted edge 68 and pipe 72. Housing 62 also includes an upper frusto-conical section 86 forming a reverted edge 88 around circular opening 90 through which extends tubular conduit 42.

The next major component of water connection 22 is a cylindrical sleeve shown generally at 92 underlying and concentric with opening 90. Sleeve 92 includes an enlarged cylindrical wall 94 affixed, as by welding or the like, adjacent the apex of frusto-conical section 86. A gasket shown generally at 96 is affixed to cylindrical wall 94 and provides a sealing closure for opening 90 in much the same manner that gasket 78 provides a sealing closure for inlet opening 70.

Figure 6:
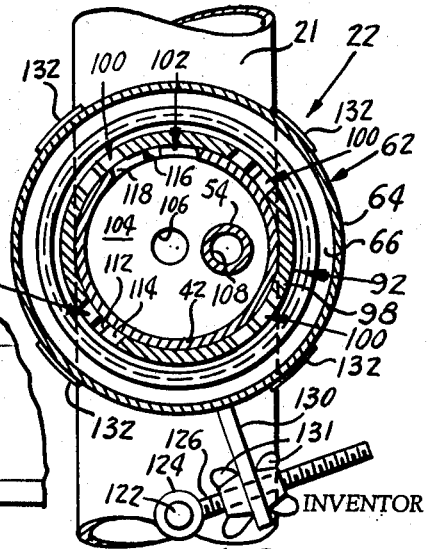
FIGURE 6 is a horizontal cross-sectional view of the connection of FIGURES 4 and 5 taken substantially along line 6—6 of FIGURE 5 as viewed in the direction of the arrows.

Sleeve 92 also includes a smaller cylindrical wall 98 closely receiving and journalling the lower end of the tubular conduit 42 for rotation, as may be seen in FIGURES 5 and 6. Cylindrical wall 98 is provided with four equally spaced apertures shown generally at 100 while tubular conduit 42 is provided with an orifice shown generally at 102. The lower end of tubular conduit 42 is provided with a closure plate 104 having a first opening 106 communicating with the interior of conduit 42 and a second opening 108 communicating with separate water delivery conduit 54. Plate 104, and consequently conduit 42, are supported by an inwardly extending shoulder 105 integral with sleeve 98.

When water is delivered under pressure through supply pipe 18, it enters housing 62 and passes through openings 106, 108 from which it flows to sprinkler head 20. When sprinkler head 20 begins to rotate, orifice 102 will be sequentially aligned with apertures 100 to increase the flow area between housing 62 and the interior of conduit 42. It will be apparent that when one of apertures 100 is aligned with orifice 102, a greater quantity of water will flow through conduit 42 in much the same manner that the opening of a spigot will deliver more water through a garden hose. As is apparent from the garden hose analogy, the opening of the valve formed by apertures 100 and orifice 102 will result in a greater flow of water through conduit 42 at a higher pressure. Accordingly, the corners of quadrilateral pattern 26 will be watered while orifice 102 is aligned with aperture 100.

Figure 8:
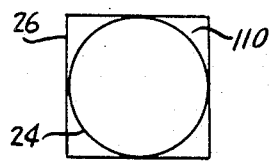
FIGURE 8 is a schematic view of the quadrilateral watered area of the instant invention superimposed over the circular watered area of a conventional rotary water sprinkler.
Figure 7:
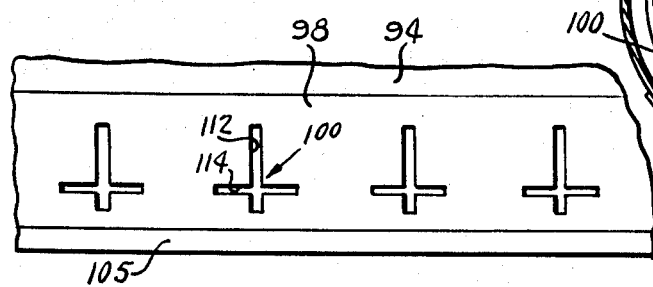
FIGURE 7 is an expanded or flattened view of the water passing sleeve of the connection of FIGURES 4 and 6 inclusive.

It has been found that the circular configuration for aperture 100 and orifice 102 does not distribute water in the necessary quantities and pressure at the corners to precisely achieve the square pattern shown in FIGURE 8, although an improved pattern is obtained. The reason circular orifices do not obtain a square pattern is that the area between circular pattern 24 and square pattern 26, hereinafter denominated as 110, changes size in an unusual manner and since the pressure needed to propel the water to area 110 also effects the opening required between aperture 100 and orifice 102. After some experimentation it has been found that aperture 100 and orifice 102 must cooperate to produce an opening that is initially rather small, which initially increases in size rather slowly, which then increases rapidly in size, followed by a rapid diminution in size and slow tapering off to a closed position.

Some experimentation has been done to determine the most advantageous configuration of aperture 100 and orifice 102 and it has been found that while diamond-shaped configurations are practicable the most efficient coverage is achieved by configuring both aperture 100 and orifice 102 as a cross. Accordingly, aperture 100 is provided with a vertical slit 112 and a horizontal slit 114 with vertical slit 112 being of substantially greater size than horizontal slit 114. For purposes of orienting slit 112 with the remainder of water connection 22, it should be noted that slit 112 resides in a plane passing through the axis of rotation of tubular conduit 42. Since slit 114 is perpendicular to slit 112, it is apparent that slit 114 resides in a plane perpendicular to the axis of rotation of conduit 42.

For reasons previously mentioned, orifice 102 is provided with a first slit 116 and a second slit 118 with first slit 116 being of substantially greater width than slit 118. It should be apparent that orifice 102 is formed in conduit 42 such that second slit 118 will reside in the same plane as horizontal slit 114 of aperture 100. Although only one orifice 102 is illustrated, it should be pointed out that multiple orifices, spaced at 90° around conduit 42, may be provided.

It often happens that it is inconvenient to place water sprinkler 10 such that the increased water flow resulting from the alignment of apertures 100 and orifice 102 is directed toward the corners of the quadrilateral area to be sprayed. This often happens because of a prevailing wind that distorts the sprayed area somewhat but can also occur because of the disalignment of a row crop with respect to the boundaries of the watered area. Because agricultural sprinklers are often quite large, it will be readily apparent that an adjustment thereof can be a laborious chore particularly when the vehicle by which sprinkler 10 has been transported to the field has departed.

Figure 4:
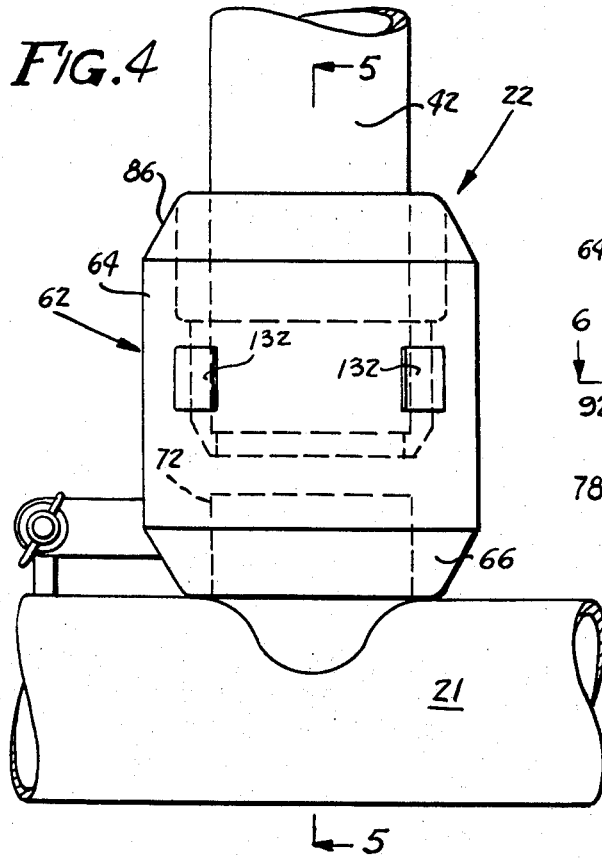
FIGURE 4 is a side elevational view of the connection between the water supply pipe and the rotating sprinkler arms of the water sprinkler of FIGURES 1 to 3 inclusive.

Accordingly, an adjustable mounting means shown generally at 120 in FIGURE 4 is provided to allow the adjustment of corner areas 110.

Mounting means 120 includes a vertical stud 122 received in an eye 124 of an eye bolt shown generally at 126, the outer end of which is threaded. An outwardly extending ear 130 is affixed, as by welding or the like, to cylindrical section 64 and is provided with an opening loosely receiving the threaded shank of eye bolt 126. A pair of nuts 131 sandwich ear 130 on eye bolt 126 to fix the relationship between housing 62 and stud 122. Since stud 122 is loosely received in eye 124, it will be seen that housing 62 may be oriented by loosening nuts 131, rotating housing 62 and retightening nuts 131. In order for an attendant to properly orient housing 62 a plurality of indicia 132 may be placed on housing 62 to indicate the direction of the corner area 110 that will be created by sprinkler 10.

It is now seen that there is herein provided an improved sprinkler having all of the objects and advantages of the instant invention and others, including many advantages of great practical importance and commercial utility.

Since many embodiments may be made in the instant inventive concept, and since many modifications may be made in the embodiment hereinbefore shown and described, it is to be understood that the foregoing is to be interpreted merely as illustrative and not in a limiting sense.

I claim:

1. A rotary sprinkler for watering a regular polygonal area comprising:
   a frame including an upright hollow cylindrical pipe having a pair of opposed open ends and means on one of its said ends affording connection to a source of water under pressure;
   a substantially hollow housing having a central cylindrical section and including a pair of opposed open ends;
   said housing having one of its ends received for rotation over the other end of said pipe and being in open communication therewith;
   an elongated substantially hollow cylindrical sleeve having one of its ends fixedly connected to the other end of said cylindrical section with the other end of said sleeve extending inwardly of said section in concentric spaced relation relative thereto, said other end of said sleeve terminating intermediate said opposed ends of said cylindrical section and having a plurality of circumferentially spaced transversely extending apertures formed therein, said other end of said sleeve having an integrally formed inwardly extending shoulder formed thereon;
   an elongated substantially hollow conduit having a pair of opposed open ends, said conduit having one of its ends journalled for rotation in said sleeve with said one end of said conduit being supported on said shoulder, said conduit having a plurality of orifices extending transversely therethrough in circumferentially spaced relationship;
   said orifices being adapted for sequential alignment with said apertures as said conduit is rotated;
   a closure plate extending across and secured to said one end of said conduit, said closure plate having an opening extending transversely therethrough to establish communication between said conduit and said housing;
   a plurality of water conducting and sprinkling arms connected on and in open communication with said conduit adjacent the other end thereof; and
   means to effect rotation of said conduit and consequently of said arms.

2. A device as defined in claim 1 wherein:
   said opposed ends of said central section terminate in axially elongated frusto-conical sections inverted with respect to one another, each of said frusto-conical sections having an inwardly reverted edge substantially at the plane of the frustum thereof;
   a first cylindrical wall having an end fixedly connected to the frusto-conical section adjacent said one end of said cylindrical section and cooperating with the adjacent one of said reverted edges to provide a first annular gasket seat;
   a first annular gasket disposed in said first gasket seat and engaging the adjacent end of said pipe to effect a liquid seal;
   said sleeve including an enlarged second cylindrical wall fixedly connected to the other of said frusto-conical sections adjacent the other end of said cylindrical section and cooperating with the other of said reverted edges to form a second annular gasket seat; and a second annular gasket disposed in said second gasket seat, said second annular gasket engaging said conduit adjacent its said one end to effect a second liquid seal.

3. A device as defined in claim 2 wherein:

said gaskets are V-shaped and the apex of each is engaged in the adjacent one of said reverted edges.

4. A device as defined in claim 3 wherein said apertures and orifices are cross-shaped and each cross-shaped aperture and orifice includes an elongated slit extending axially of said cylindrical section and a shorter slit contained in a common plane perpendicular to the axis of said cylindrical section.

References Cited

UNITED STATES PATENTS

| | | |
|---|---|---|
| 2,723,157 | 11/1955 | Thompson. |
| 2,739,839 | 3/1956 | Greener et al. _____ 239—97 |
| 3,315,970 | 4/1967 | Holloway _____ 285—374 X |

M. HENSON WOOD, Jr., *Primary Examiner.*

M. Y. MAR, *Assistant Examiner.*